(12) United States Patent
Noguchi (10) Patent No.: US 11,440,547 B2
(45) Date of Patent: Sep. 13, 2022

(54) VEHICLE TRAVEL ASSISTANCE DEVICE

(71) Applicant: ADVICS CO., LTD., Kariya (JP)

(72) Inventor: Mako Noguchi, Kariya (JP)

(73) Assignee: ADVICS CO., LTD., Kariya (JP)

( * ) Notice: Subject to any disclaimer, the term of this patent is extended or adjusted under 35 U.S.C. 154(b) by 207 days.

(21) Appl. No.: 16/764,820

(22) PCT Filed: Nov. 16, 2018

(86) PCT No.: PCT/JP2018/042468
§ 371 (c)(1),
(2) Date: May 15, 2020

(87) PCT Pub. No.: WO2019/098324
PCT Pub. Date: May 23, 2019

(65) Prior Publication Data
US 2020/0361464 A1    Nov. 19, 2020

(30) Foreign Application Priority Data

Nov. 17, 2017   (JP) .............................. JP2017-222113

(51) Int. Cl.
*B60W 30/18*    (2012.01)
*B60T 7/22*    (2006.01)
*B60W 10/184*    (2012.01)
*B60W 40/076*    (2012.01)

(52) U.S. Cl.
CPC ............. *B60W 30/181* (2013.01); *B60T 7/22* (2013.01); *B60W 10/184* (2013.01);
(Continued)

(58) Field of Classification Search
CPC ......... B60W 30/181; B60W 30/18109; B60W 10/184; B60W 40/076; B60W 2552/15;
(Continued)

(56) References Cited

U.S. PATENT DOCUMENTS 10,124,781 B2    11/2018    Ishida

FOREIGN PATENT DOCUMENTS

| DE | 10 2007 061 234 A1 | 6/2009 |
| DE | 10 2013 220 931 A1 | 4/2015 |
| DE | 10 2015 112 311 A1 | 2/2017 |

(Continued)

OTHER PUBLICATIONS

PCT/JP2018/042468 English Translation of the Written Opinion of the International Search Authority filed May 17, 2020; retrieved from https://globaldossier.uspto.gov/#/details/JP/PCT%252FJP2018%252F042468/W/79470 (Year: 2020).*

(Continued)

*Primary Examiner* — Calvin Cheung
(74) *Attorney, Agent, or Firm* — Buchanan Ingersoll & Rooney PC (57) ABSTRACT

A parking assistance unit comprises: a step determination unit that executes a first determination process for determining whether a step that a vehicle wheel has contacted is a step for stopping the vehicle; and a braking/drive force setting unit that executes a stop request control for requesting stopping of a vehicle by increasing the braking force of the vehicle, when a step has been determined by the first determination process to be a step for stopping the vehicle.

13 Claims, 5 Drawing Sheets

(52) U.S. Cl.
CPC .... *B60W 30/18109* (2013.01); *B60W 40/076* (2013.01); *B60T 2201/10* (2013.01); *B60T 2210/10* (2013.01); *B60T 2250/04* (2013.01); *B60W 2510/18* (2013.01); *B60W 2552/15* (2020.02)

(58) Field of Classification Search
CPC .............. B60W 2510/18; B60T 10/184; B60T 2201/10; B60T 2210/10; B60T 2250/04
See application file for complete search history.

(56) References Cited

FOREIGN PATENT DOCUMENTS

| | | |
|---|---|---|
| DE | 10 2015 220 467 A1 | 4/2017 |
| DE | 10 2015 118471 A1 | 5/2017 |
| JP | 2007-008415 A | 1/2007 |
| JP | 2007030581 A | 2/2007 |
| JP | 2012116360 A | 6/2012 |
| JP | 2014-226194 A | 12/2014 |
| JP | 2017-099607 A | 6/2017 |

OTHER PUBLICATIONS

International Search Report (PCT/ISA/210) dated Feb. 5, 2019, by the Japan Patent Office as the International Searching Authority for International Application No. PCT/JP2018/042468.
Written Opinion (PCT/ISA/237) dated Feb. 5, 2019, by the Japan Patent Office as the International Searching Authority for International Application No. PCT/JP2018/042468.

* cited by examiner

DRIVE FORCE

FIG. 3B

VEHICLE BODY SPEED

VEHICLE TRAVEL ASSISTANCE DEVICE

TECHNICAL FIELD

The present invention relates to a vehicle travel assistance device that assists vehicle travel at the time when a vehicle wheel has contacted a step.

BACKGROUND ART

PTL 1 discloses an example of a travel assistance device that, when it is determined that a vehicle wheel of a vehicle has run on a step, actuates a braking device of the vehicle so as to narrow a gap between a disc and a pad to such a degree that the pad does not contact the disc configured to rotate integrally with the vehicle wheel. The braking device is actuated in this way, so that when a driver performs a braking operation at the time when the vehicle wheel has run on the step, a braking force can be rapidly applied to the vehicle.

CITATION LIST

Patent Literature

PTL 1: JP-A-2007-30581

SUMMARY OF INVENTION

Technical Problem

The driver may panic when the vehicle wheel has run on the step. When the driver panics, the driver may not appropriately operate the vehicle. For example, the driver may perform erroneously an accelerator operation even though it is originally necessary to perform a braking operation, or the driver may become stiff and delay start of the braking operation. That is, there is room for improvement in terms of increasing safety of the vehicle in a case where, when the vehicle wheel has run on the step, an inappropriate operation is performed by the driver or an inappropriate instruction is input to a travel assistance device during automatic traveling.

Solution to Problem

A vehicle travel assistance device for solving the above problems is a vehicle travel assistance device configured to assist vehicle travel, and including a step determination unit that, when a step for stopping a vehicle of steps for which it is possible to detect that a vehicle wheel has contacted is set as a step for stopping a vehicle, executes a determination process for determining whether a step that the vehicle wheel has contacted is the step for stopping a vehicle, and a braking/drive force setting unit that, when it is determined by the determination process that the step is the step for stopping a vehicle, executes a stop request control for requesting stopping of a vehicle by increasing a braking force of the vehicle.

In an area where there is a step on which the vehicle wheel can run, it is not preferable from a standpoint of safety that the vehicle does not stop even though the vehicle wheel of the traveling vehicle climbs over a step for stopping a vehicle. In this respect, according to the above configuration, when the step that the vehicle wheel of the traveling vehicle has contacted is the step for stopping a vehicle, the stop request control is executed to increase the braking force of the vehicle, so that the vehicle can be stopped. For this reason, it is possible to suppress the safety of the vehicle from being deteriorated when the vehicle wheel has run on the step.

DESCRIPTION OF EMBODIMENTS

Hereinbelow, an embodiment of the vehicle travel assistance device will be described with reference to FIGS. 1 to 8.

Figure 1:
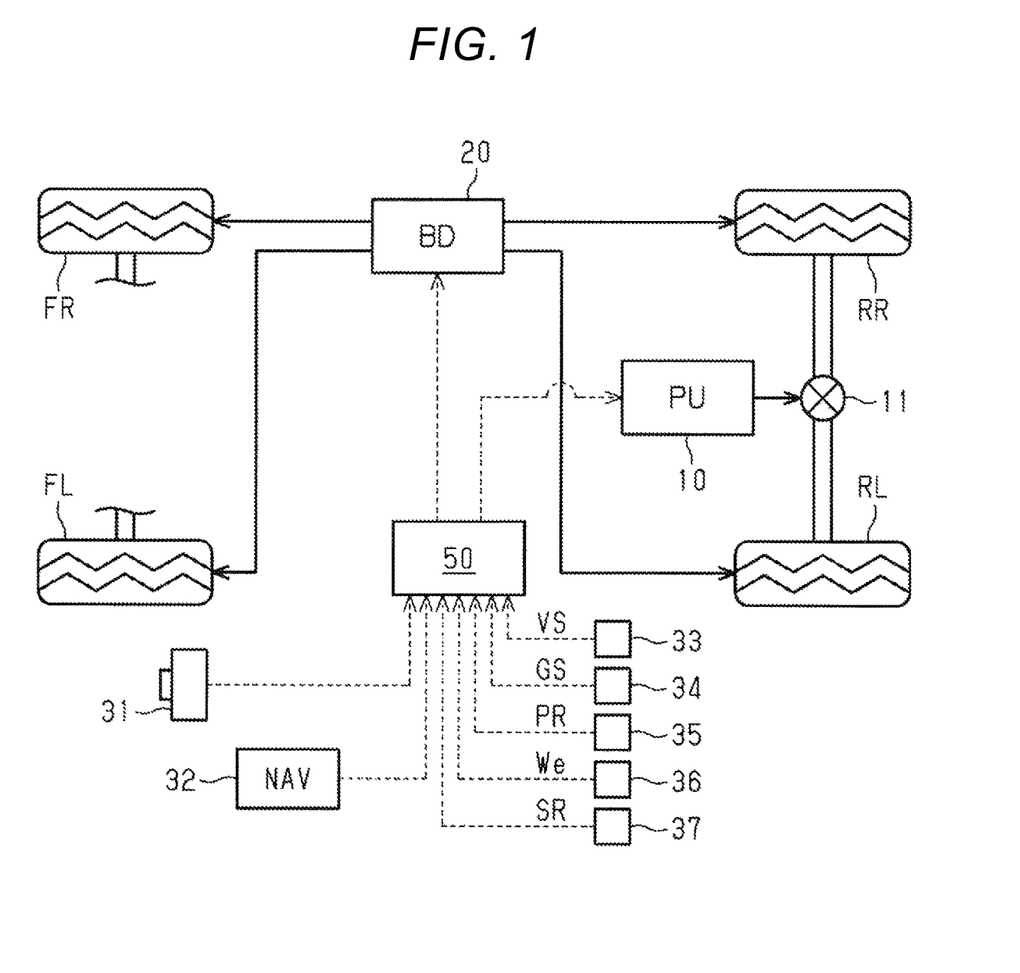
FIG. 1 is a configuration view depicting an outline of a vehicle including a control device having a function as an embodiment of a vehicle travel assistance device.

FIG. 1 depicts an example of a vehicle including a control device 50 having a function as a travel assistance device of the present embodiment. As shown in FIG. 1, a drive device 10 of the vehicle includes a power source of the vehicle, such as an engine, an electric motor and the like. A drive force that is output from the drive device 10 is transmitted to rear wheels RL and RR via a differential 11. That is, in the vehicle, the rear wheels RL and RR function as drive wheels, and front wheels FL and FR function as driven wheels.

A braking device 20 of the vehicle is actuated to individually adjust a braking force that is to be applied to the respective vehicle wheels FL, FR, RL and RR. Also, when a driver of the vehicle performs a braking operation, the braking device 20 is actuated so that a braking force corresponding to a braking operation amount thereof is applied to the respective vehicle wheels FL, FR, RL and RR.

As shown in FIG. 1, the vehicle is provided with a monitoring device 31, a navigation device 32, a vehicle speed detection system 33, an acceleration detection system 34, a pitch angle detection system 35, a vehicle weight detection system 36 and a road surface slope detection system 37. The monitoring device 31 has a capturing means such as a camera and a radar, and is configured to monitor a periphery of a host vehicle by using the same. Also, the monitoring device 31 is configured to determine whether there is an obstacle in a traveling direction of the host vehicle and to calculate a relative distance from the host vehicle to an obstacle, for example, by analyzing information obtained as a result of the monitoring using the capturing means, the radar and the like. The monitoring device 31 is configured to output information obtained as a result of diverse analysis processes to the control device 50. The navigation device 32 is configured to determine in which of areas the host vehicle is located, based on position information of the host vehicle obtained from a global positioning system and the like, and to notify a position of the host vehicle on a map to the driver. Also, the navigation device 32 is configured to output the acquired position information of the host vehicle, information for specifying the area in which the host vehicle is located, and the like to the control device 50.

The vehicle speed detection system 33 is configured to calculate a vehicle body speed vs that is a moving speed of the vehicle, based on wheel speeds of the respective vehicle wheels FL, FR, RL and RR, and the like. The acceleration detection system 34 is configured to calculate a vehicle body acceleration GS that is an acceleration of the vehicle in a front and rear direction, based on a detection signal of an acceleration sensor and the like. The pitch angle detection system 35 is configured to calculate a pitch angle PR of the vehicle, based on a detection signal of a sensor configured to detect an amount of rotation of the vehicle in a direction around an axis extending in a vehicle width direction, for example. The vehicle weight detection system 36 is configured to calculate a weight We of the vehicle. The road surface slope detection system 37 is configured to calculate a slope SR of a road surface on which the vehicle travels. The information obtained from the respective detection systems 33 to 37 is output to the control device 50.

Figure 2:
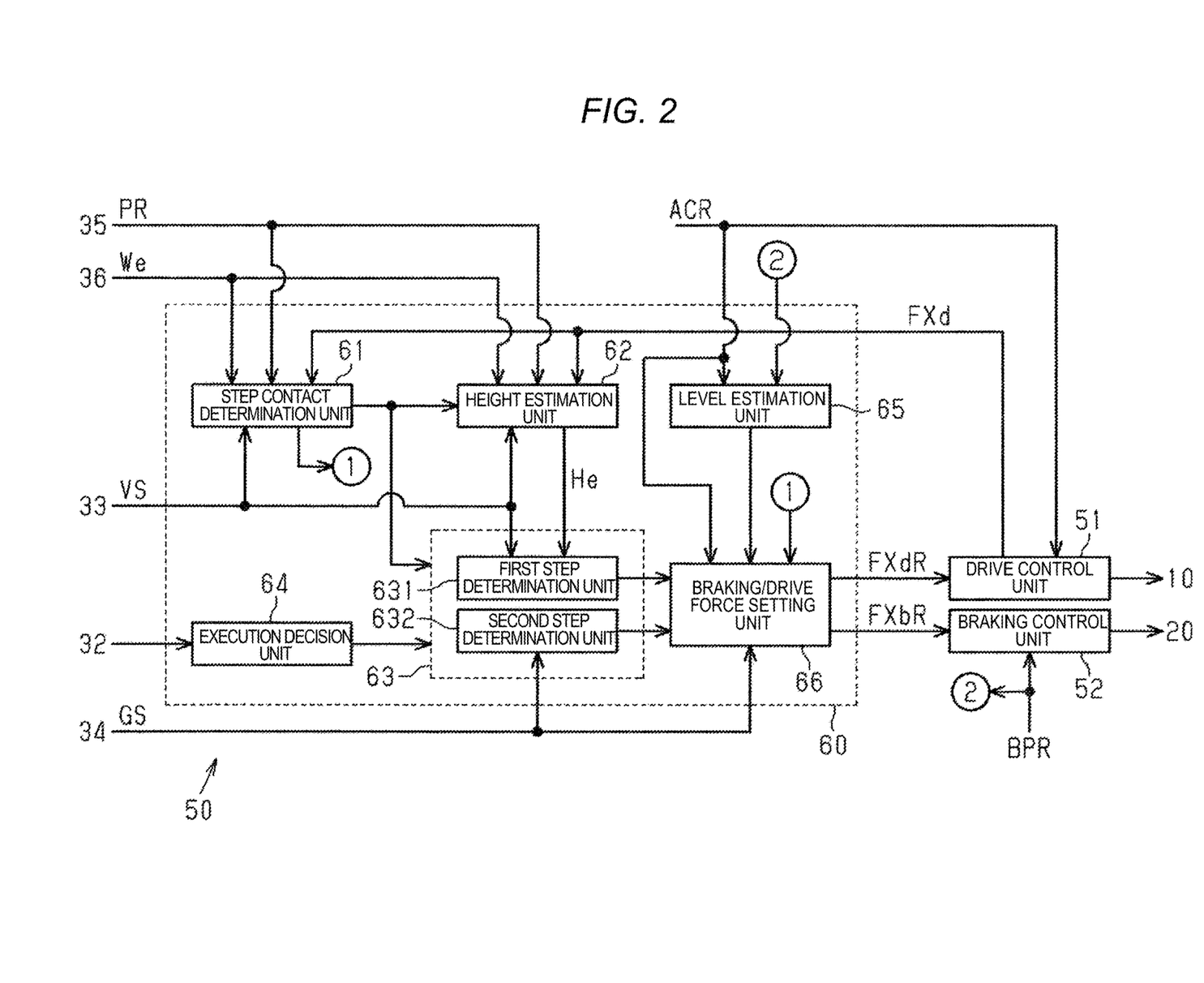
FIG. 2 is a block diagram depicting a functional configuration of the control device.

As shown in FIG. 2, the control device 50 has, as functional units, a parking assistance unit 60, a drive control unit 51 configured to control the drive device 10, and a braking control unit 52 configured to control the braking device 20. The parking assistance unit 60 is an example of "travel assistance device" configured to assist vehicle travel in an area (a parking lot and the like) in which there is a step on which the vehicle wheels FL, FR, RL and RR can run. As the step, a step for stopping a vehicle that is a step for stopping a vehicle, and a lock plate equipped in a coin parking or the like may be exemplified. In the present embodiment, a step that the vehicle wheels FL, FR, RL and RR may climb over when a vehicle is traveling toward a parking position, such as a lock plate in a coin parking or the like, is also referred to as a "climb-over permission step". Also, the step for stopping a vehicle is a step for defining a parking position, and is a step that is not preferable for the vehicle wheels FL, FR, RL and RR to climb over when parking a vehicle.

The drive control unit 51 is configured to control the drive device 10, based on an accelerator operation amount ACR that is an operation amount of an accelerator pedal performed by the driver of the vehicle. Also, when a drive force request value FXdR is received from the parking assistance unit 60, the drive control unit 51 controls the drive device 10, based on the received drive force request value FXdR. That is, the drive control unit 51 is configured to control the drive device 10 so that the larger the drive force request value FXdR is, the greater a drive force FXd of the vehicle is.

The braking control unit 52 is configured to control the braking device 20, based on a braking operation amount BPR that is an operation amount of a brake pedal performed by the driver of the vehicle. Also, when a braking force request value FXbR is received from the parking assistance unit 60, the braking control unit 52 controls the braking device 20, based on the received braking force request value FXbR. That is, the braking control unit 52 is configured to control the braking device 20 so that the larger the braking force request value FXbR is, the greater the braking force FXb of the vehicle is.

The parking assistance unit 60 has a step contact determination unit 61, a height estimation unit 62, a step determination unit 63, an execution decision unit 64, a level estimation unit 65 and a braking/drive force setting unit 66.

Figure 3A:
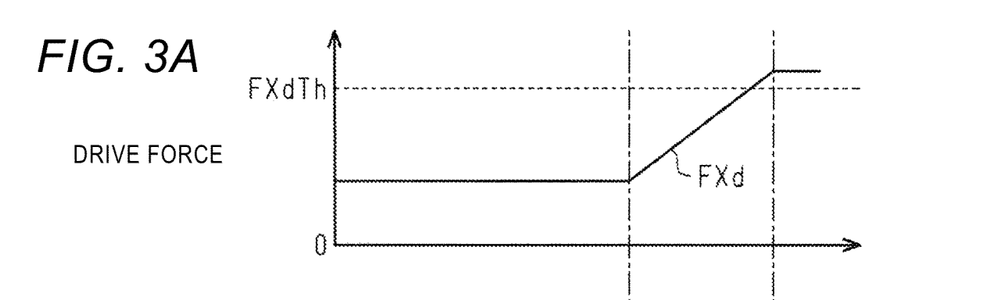
FIGS. 3A and 3B are timing charts when a vehicle wheel has contacted a step.
Figure 3B:
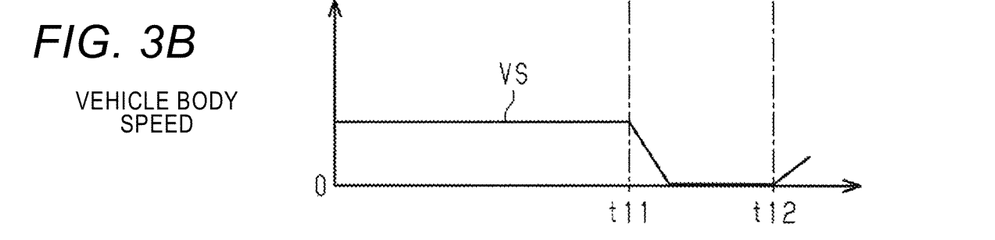

The step contact determination unit 61 is configured to determine whether at least one of the respective vehicle wheels FL, FR, RL and RR has contacted a step. For example, the step contact determination unit 61 performs the determination, based on a drive force FXd of the vehicle, a vehicle body speed VS of the vehicle, a weight We of the vehicle and a pitch angle PR of the vehicle. The specific determination method will be described later with reference to FIG. 3.

When it is determined by the step contact determination unit 61 that at least one of the respective vehicle wheels FL, FR, RL and RR has contacted a step, the height estimation unit 62 calculates a height estimation value He that is an estimation value of a height of the step that the vehicle wheel has contacted. For example, the height estimation unit 62 calculates the height estimation value He, based on the drive force FXd of the vehicle, the vehicle body speed VS of the vehicle, the weight We of the vehicle and the pitch angle PR of the vehicle. The specific method of calculating the height estimation value He will be described later with reference to FIGS. 4 and 5.

The step determination unit 63 includes a first step determination unit 631 and a second step determination unit 632. When it is determined by the step contact determination unit 61 that at least one of the respective vehicle wheels FL, FR, RL and RR has contacted a step, the first step determination unit 631 executes a first determination process for determining whether the step that the vehicle wheel has contacted is a step for stopping a vehicle. The first determination process corresponds to an example of "determination process". For example, the first step determination unit 631 executes the first determination process, based on the height estimation value He calculated by the height estimation unit 62 and vehicle body speed VS. The specific contents of the first determination process will be described with reference to FIG. 6.

The second step determination unit 632 is configured to execute a second determination process for determining whether at least one of the respective vehicle wheels FL, FR, RL and RR has climbed over a step for stopping a vehicle. The second determination process corresponds to an example of "another determination process". For example, the second step determination unit 632 executes the second determination process, based on a vehicle body acceleration GS of the vehicle. The specific contents of the second determination process will be described later with reference to FIG. 7.

The execution decision unit 64 is configured to acquire position information of the host vehicle and information of specifying an area in which the host vehicle is located from the navigation device 32, and to decide whether or not to permit executions of the respective determination processes by the step determination unit 63, based on the information. For example, when a vehicle travels in an area in which there is no step for stopping a vehicle, such as a road, it is not necessary to perform parking assistance of the vehicle that is an example of the vehicle travel assistance. For this reason, the execution decision unit 64 is configured to determine whether it is necessary to perform the parking assistance of the vehicle, based on the information acquired from the navigation device 32. When the vehicle travels in an area in which there may be a step for stopping a vehicle, such as a parking lot, and when the vehicle enters the area, the execution decision unit 64 determines that it is necessary to perform the parking assistance, and permits the executions of the respective determination processes. On the other hand, when it is not determined that it is necessary to perform the parking assistance, such as a case where the vehicle travels on a road, the execution decision unit 64 does not permit the executions of the respective determination processes.

The level estimation unit 65 is configured to estimate a vehicle operation level of the driver, based on a history of the accelerator operation and a history of the braking operation. For example, the level estimation unit 65 estimates a vehicle operation level so that, when increasing the accelerator operation amount ACR so as to accelerate the vehicle, the vehicle operation level is lower in a case where a frequency of performing an accelerator operation such as rapid acceleration of a vehicle is high than in a case where the frequency is low. Also, the level estimation unit 65 estimates the vehicle operation level so that, when increasing the braking operation amount BPR so as to decelerate the vehicle, the vehicle operation level is lower in a case where a frequency of performing a braking operation such as rapid deceleration of a vehicle is high than in a case where the frequency is low. Also, the level estimation unit 65 estimates the vehicle operation level so that the vehicle operation level is lower in a case where an interval time after an operation on one pedal of an accelerator pedal and a brake pedal is over until an operation on the other pedal starts is short than in a case where the interval time is long. When an estimation value of the vehicle operation level is equal to or greater than a level determination value, the level estimation unit 65 determines that the vehicle operation level of the driver is high. On the other hand, when an estimation value of the vehicle operation level is below the level determination value, the level estimation unit 65 determines that the vehicle operation level of the driver is low.

The braking/drive force setting unit 66 is configured to execute a stop request control or an acceleration suppression request control, based on results of the respective determination processes in the step determination unit 63, the vehicle operation level of the driver determined by the level estimation unit 65, the vehicle body acceleration GS of the vehicle, and the accelerator operation amount ACR. The stop request control is a control for requesting stopping of the vehicle by increasing the braking force of the vehicle. The acceleration suppression request control is a control for requesting at least one of an increase in the braking force of the vehicle and a decrease in the drive force of the vehicle so as to suppress the vehicle acceleration. A method of determining whether to execute the stop request control or the acceleration suppression request control and specific contents of the control to be executed will be described later with reference to FIG. 6.

Subsequently, a process that is executed by the step contact determination unit 61 when determining whether the vehicle wheel has contacted a step, specifically whether the vehicle wheel has run on a step is described with reference to FIG. 3. FIGS. 3A and 3B show changes in the drive force FXd and the vehicle body speed VS when the vehicle wheel has contacted a step while the vehicle is traveling at a constant speed.

As shown in FIGS. 3A and 3B, when the vehicle wheel of the vehicle that is traveling at a constant speed contacts a step at timing t11, the vehicle body speed VS decreases. Then, when the accelerator operation amount ACR is increased and the drive force FXd of the vehicle is increased, the vehicle wheel runs on the step at timing t12. Then, the vehicle body speed VS increases.

Therefore, the step contact determination unit 61 determines that the vehicle wheel has contacted the step, i.e., the vehicle wheel has run on the step, when both conditions that it is detected that the drive force FXd is increasing even though the vehicle body speed VS is decreasing and that the drive force FXd at the time when the vehicle body speed VS starts to increase immediately thereafter is equal to or greater than a determination drive force FXdTh are satisfied. In the meantime, the determination drive force FXdTh is a reference value for determining whether the vehicle wheel has run on the step by using the drive force FXd.

The higher the vehicle body speed VS is at the time when the vehicle wheel has contacted the step, the greater an inertia force of the vehicle is at the time when the vehicle wheel has contacted the step. Also, the inertia force of the vehicle at the time when the vehicle wheel has contacted the step is greater in a case where a slope of a road surface on which the step is provided is a downhill slope than in a case where the slope of the road surface is not a downhill slope. The greater the inertia force of the vehicle is, the lower a drive force is which is necessary at the time when the vehicle wheel runs on the step. Therefore, the step contact determination unit 61 calculates the determination drive force FXdTh so that the determination drive force FXdTh is lower in a case where the vehicle body speed vs is high than in a case where the vehicle body speed VS is low, and so that the determination drive force FXdTh is lower in a case where the slope of the road surface is a downhill slope than in a case where the slope is not a downhill slope.

Subsequently, a process that is executed by the height estimation unit 62 when calculating the height estimation value He of the step that the vehicle wheel has contacted is described with reference to FIGS. 4 and 5.

The higher the height of the step is at the time when the vehicle wheel runs on the step, the minimum value of the drive force FXd by which the vehicle wheel is caused to run on the step is more likely to increase. For this reason, the height estimation unit 62 calculates the height estimation value He so that the greater the drive force FXd of the vehicle is at the time when it is determined by the step contact determination unit 61 that the vehicle wheel has run on the step, the greater the height estimation value He is.

Incidentally, a relation between the drive force and the height of the step is slightly different between a case where the driven wheel has run on the step and a case where the drive wheel has run on the step. For this reason, in the present embodiment, a method of calculating the height estimation value He of the step is changed between the case where the driven wheel has run on the step and the case where the drive wheel has run on the step.

Figure 4:
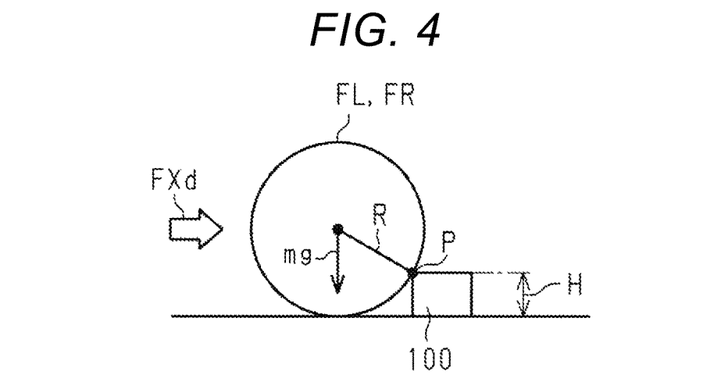
FIG. 4 is a pictorial view depicting an aspect where a driven wheel of the vehicle contacts a step.

FIG. 4 depicts an aspect where the front wheels FL and FR, which are the driven wheels, are in contact with a step 100. In a state where both the front wheels FL and FR are in contact with the step, when a part of the front wheels FL and FR which is in contact with the step 100 is denoted with a contact point P, a moment Ms that is generated at the contact point P by a total "mg" of the gravity acting on the front wheels FL and FR can be represented by a following relational expression (equation 1). Also, a moment Mf that is generated at the contact point P by the drive force FXd that is a force of pushing the vehicle wheel toward the step 100 can be represented by a following relational expression (equation 2). In the relational expressions (equation 1 and equation 2), "H" is an actual height of the step 100, and "R" is a radius of the front wheel FL and FR.

[Formula 1]

$$Ms = mg \cdot \sqrt{H \cdot (2 \cdot R - H)} \qquad \text{(equation 1)}$$

$$Mf = (R - H) \cdot FXd \qquad \text{(equation 2)}$$

When the moment Mf is greater than the moment Ms, the front wheels FL and FR can run on the step 100. Therefore, the height estimation unit 62 can calculate the height estimation value He of the step 100 by substituting the drive force FXd at the time when it is determined that the front wheels FL and FR have run on the step 100 into a following relational expression (equation 3).

[Formula 2]

$$(R-H) \cdot FXd = mg \cdot \sqrt{He \cdot (2R-He)} \quad \text{(equation 3)}$$

Figure 5:
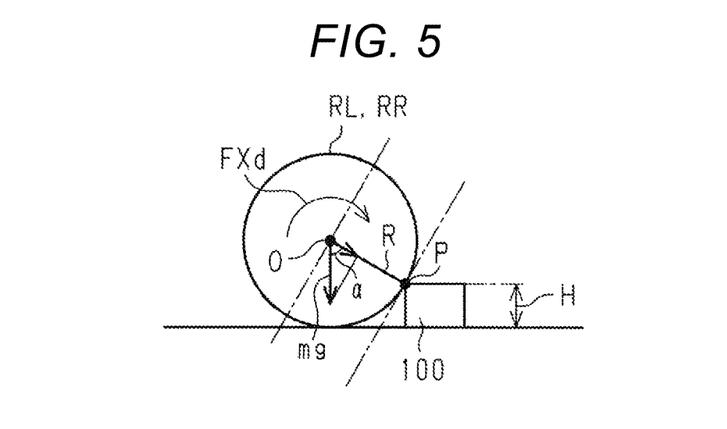
FIG. 5 is a pictorial view depicting an aspect where a drive wheel of the vehicle contacts the step.

FIG. 5 depicts an aspect where the rear wheels RL and RR that are the drive wheels are in contact with the step 100. In a state where both the rear wheels RL and RR are in contact with the step 100, when an angle between an extension direction of a line passing a center O of the rear wheels RL and RR and the contact point P and a direction of a total "mg" of the gravity acting on the rear wheels RL and RR is denoted as a step equivalent angle α, a drive torque Td that is a total of drive torques of the rear wheels RL and RR at the contact point P with the step 100 can be represented by a following relational expression (equation 4). In the relational expression (equation 4), "R" is a radius of the rear wheels RL and RR.

[Formula 3]

$$Td = R \cdot mg \cdot \sin \alpha \quad \text{(equation 4)}$$

The height estimation unit 62 can calculate the drive torque Td at the time when the rear wheels RL and RR have run on the step 100, based on the drive force FXd at the time when the rear wheels RL and RR have run on the step 100. The height estimation unit 62 can calculate the step equivalent angle α by substituting the drive torque Td into the relational expression (equation 4). The greater the drive torque Td is, the greater the step equivalent angle α is. The height estimation unit 62 can calculate the height estimation value He of the step 100, based on the step equivalent angle α. In this case, the greater the step equivalent angle α is, the greater the height estimation value He is. In the meantime, the drive torque Td in a state where only one of both the rear wheels RL and RR is in contact with the step 100 can also be calculated using the relational expression (equation 4) by changing "mg" into the gravity acting on one rear wheel in contact with the step.

In the meantime, the height estimation value He of the step 100 calculated as described above is a value that is calculated on the assumption that the vehicle wheels have run on the step 100 from a situation in which the vehicle wheels are in contact with the step 100, in a state where the vehicle is located on a horizontal road and the vehicle body speed VS is substantially "0". Actually, there is a case where the vehicle wheels may contact the step 100 in a situation where the vehicle is traveling at a certain speed. The higher the vehicle body speed VS of the vehicle is, the greater the inertia force of the vehicle is which is generated when the vehicle wheels have contacted the step 100 in a situation where the vehicle is traveling. Therefore, the vehicle wheels can be caused to run on the step 100 with the less drive force FXd. For this reason, the height estimation unit 62 corrects the height estimation value He calculated as described above, based on the vehicle body speed VS at that time. Specifically, the height estimation unit 62 corrects the height estimation value He so that the height estimation value He is greater when the vehicle body speed VS is high than when the vehicle body speed VS is low.

Also, when the vehicle is traveling on a road surface with a downhill slope, both the inertia force of the vehicle and a component (a force of accelerating the vehicle in the traveling direction) of the gravity acting in a traveling direction of the vehicle are applied to the vehicle. Therefore, it is possible to cause the vehicle wheels to run on the step 100 with the drive force FXd less than in a case where the vehicle is traveling on a road surface where the step 100 is not a downhill slope. For this reason, the height estimation unit 62 corrects the height estimation value He calculated as described above, based on the slope SR of a road surface. Specifically, the height estimation unit 62 corrects the height estimation value He so that when a road surface has a downhill slope, the greater an absolute value of the slope SR is, the greater the height estimation value He is. Also, the height estimation unit 62 corrects the height estimation value He so that when a road surface has an uphill slope, the greater an absolute value of the slope SR is, the smaller the height estimation value He is.

The relation between the drive force FXd at the time when the vehicle wheels run on the step 100 and the height of the step 100 is also changed depending on the weight We of the vehicle. When the vehicle wheels are caused to run on the step 100 under a situation where the vehicle wheels are in contact with the step 100 in a state where the vehicle body speed VS is "0", the greater the weight We of the vehicle is, the more difficult the vehicle wheels run on the step 100. In the meantime, when the vehicle is traveling, the greater the weight We of the vehicle is, the greater the inertia force of the vehicle is which is generated when the vehicle wheels have contacted the step 100. For this reason, when the vehicle wheels of the vehicle traveling at a certain speed or higher contact the step 100 and the vehicle wheels are caused to run on the step 100, since an influence of the inertia force of the vehicle is high, the greater the weight We of the vehicle is, the vehicle wheels are caused to run on the step 100 in a state where the drive force FXd of the vehicle is lower. On the other hand, when the vehicle wheels of the vehicle traveling below a certain speed contact the step 100 and the vehicle wheels are caused to run on the step 100, since an influence of the inertia force of the vehicle is low, the greater the weight We of the vehicle is, the vehicle wheels are caused to run on the step 100 in a state where the drive force FXd of the vehicle is higher. For this reason, when the vehicle body speed VS is equal to or higher than a reference speed at the time when the vehicle wheels have contacted the step 100, the height estimation unit 62 corrects the height estimation value He so that the greater the weight We of the vehicle is, the greater the height estimation value He is. On the other hand, when the vehicle body speed VS is lower than the reference speed at the time when the vehicle wheels have contacted the step 100, the height estimation unit 62 corrects the height estimation value He so that the greater the weight We of the vehicle is, the smaller the height estimation value He is.

Subsequently, a process routine that is executed by the first step determination unit 631 is described with reference to FIG. 6. In the meantime, the process routine is executed when the step contact determination unit 61 determines that the vehicle wheels have contacted the step 100 and the height estimation unit 62 calculates the height estimation value He of the step 100.

Figure 6:
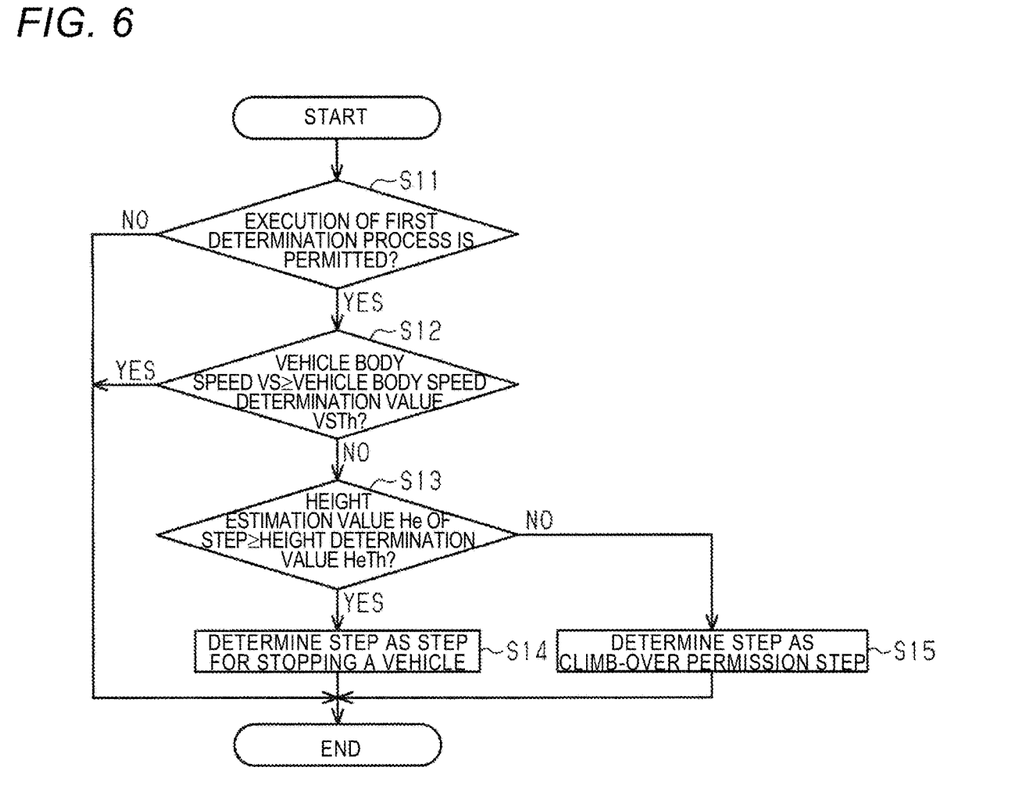
FIG. 6 is a flowchart for illustrating a process routine that is executed so as to determine whether a step that the vehicle wheel has contacted is a step for stopping a vehicle.

As shown in FIG. 6, in the present process routine, the first step determination unit 631 determines whether it is permitted to execute the first determination process by the execution decision unit 64 (S11). When it is determined that the execution of the first determination process is not permitted (S11: NO), the first step determination unit 631 ends the present process routine. On the other hand, when it is determined that the execution of the first determination process is permitted (S11: YES), the first step determination unit 631 determines whether the vehicle body speed VS of the vehicle is equal to or greater than a vehicle body speed determination value VSTh (S12). The parking assistance is a control that is executed when the vehicle is traveling at low speeds. Therefore, when the vehicle is traveling at a certain speed or higher, it can be determined that there is a possibility that the vehicle is not parking. For this reason, the vehicle body speed determination value VSTh is set so that it is possible to determine whether there is a possibility that the vehicle is parking, based on the vehicle body speed VS. When the vehicle body speed VS is equal to or higher than the vehicle body speed determination value VSTh, it is determined that there is a possibility that the vehicle is not parking. On the other hand, when the vehicle body speed VS is lower than the vehicle body speed determination value VSTh, it is determined that there is a possibility that the vehicle is parking.

For this reason, when the vehicle body speed VS is equal to or greater than the vehicle body speed determination value VSTh (S12: YES), the first step determination unit 631 ends the present process routine. On the other hand, when the vehicle body speed VS is less than the vehicle body speed determination value VSTh (S12: NO), the first step determination unit 631 executes the first determination process for determining whether the height estimation value He of the step 100 calculated by the height estimation unit 62 is equal to or greater than a height determination value HeTh (S13). The height determination value HeTh is a reference for determining whether the step 100 that the vehicle wheels have contacted is a step for stopping a vehicle.

When the height estimation value He is equal to or greater than the height determination value HeTh (S13: YES), the first step determination unit 631 determines that the step 100 that the vehicle wheels have contacted is a step for stopping a vehicle (S14), and then ends the present process routine. On the other hand, when the height estimation value He is smaller than the height determination value HeTh (S13: NO), the first step determination unit 631 determines that the step 100 that the vehicle wheels have contacted is a climb-over permission step (S15), and then ends the present process routine.

Subsequently, a second determination process that is executed by the second step determination unit 632 is described with reference to FIG. 7. In the meantime, the second step determination unit 632 executes the second determination process when all conditions that it is not determined by the first step determination unit 631 that the step 100 that the vehicle wheels have contacted is a step for stopping a vehicle, that the vehicle body speed VS of the vehicle is less than the vehicle body speed determination value VSTh, and that the execution of the second determination process is permitted by the execution decision unit 64 are satisfied.

Figure 7:
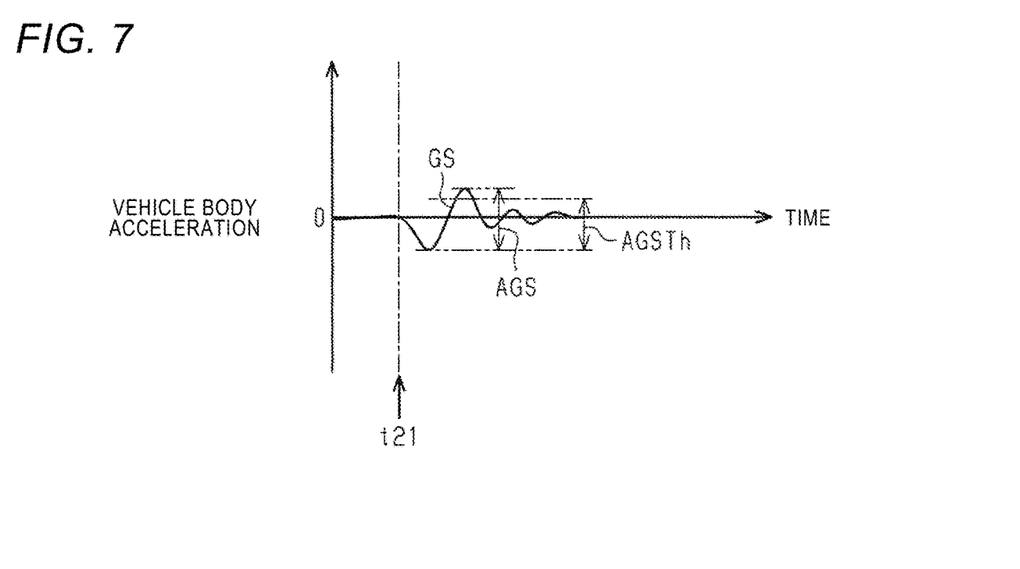
FIG. 7 is a timing chart depicting a change in vehicle body acceleration of the vehicle when the vehicle wheel has climbed over the step for stopping a vehicle.

When the vehicle wheels have climbed over the step 100 and the vehicle wheels have landed on the road surface at timing t21, since a reaction force that is applied to the vehicle wheel from the road surface, i.e., shock vibrates, the vehicle body acceleration GS of the vehicle vibrates, as shown in FIG. 7. At this time, a vibration width AGS of the vehicle body acceleration GS increases as the step 100 on which the vehicle wheels have run is higher.

Therefore, the second step determination unit 632 acquires the vibration width AGS of the vehicle body acceleration GS, and determines that the vehicle wheels have climbed over a step for stopping a vehicle when the vibration width AGS is equal to or greater than a determination vibration width AGSTh. On the other hand, the second step determination unit 632 does not determine that the vehicle wheels have climbed over a step for stopping a vehicle when the acquired vibration width AGS is smaller than the determination vibration width AGSTh. That is, the determination vibration width AGSTh is a reference for determining whether the vehicle wheels have climbed over a step for stopping a vehicle, based on the vibration width AGS of the vehicle body acceleration GS.

Subsequently, a process routine that is executed by the braking/drive force setting unit 66 is described with reference to FIG. 8. In the meantime, the present process routine is executed when a result of the determination in the step determination unit 63(631, 632) is input to the braking/drive force setting unit 66.

Figure 8:
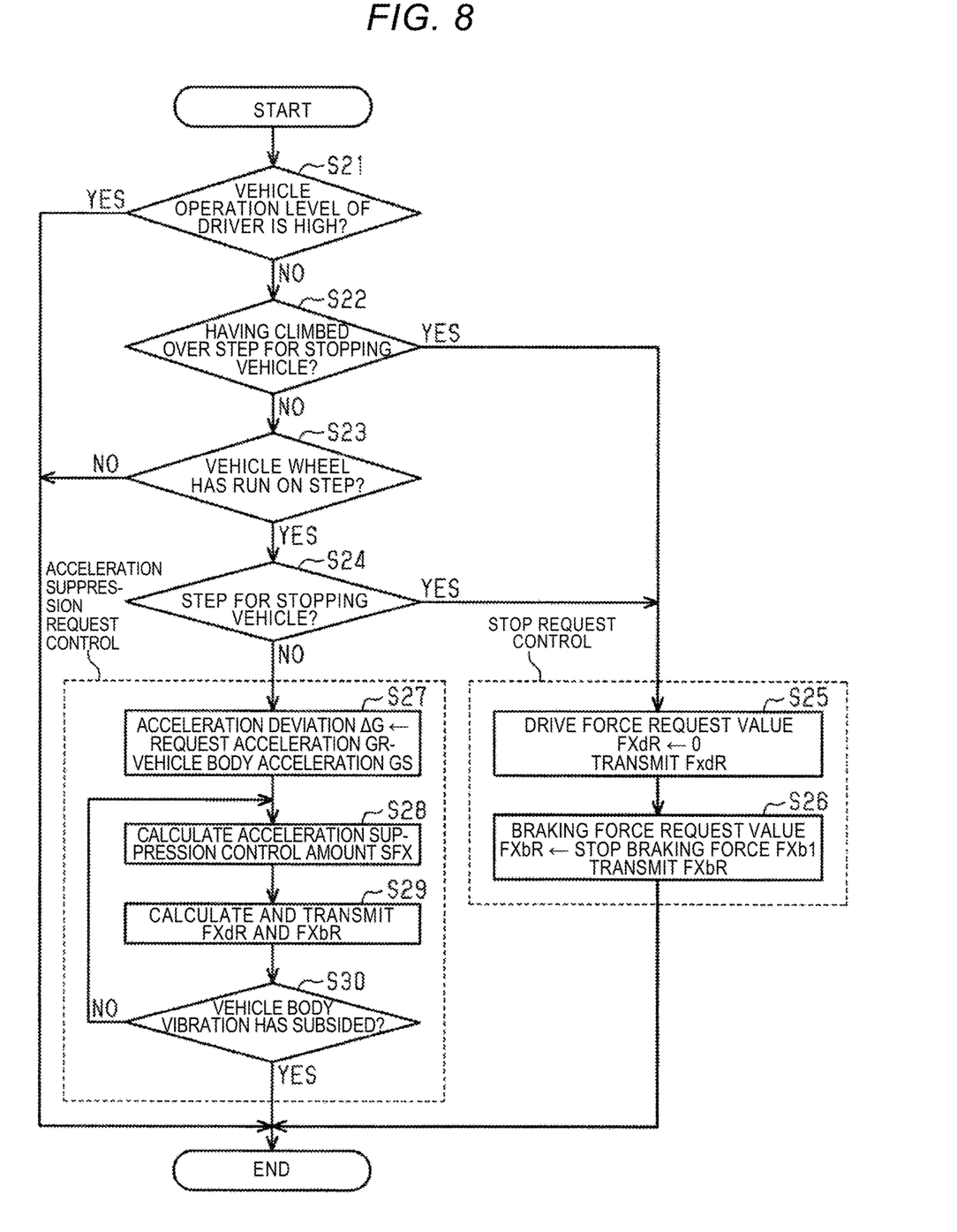
FIG. 8 is a flowchart for illustrating a process routine that is executed so as to calculate a drive force request value and a braking force request value when the vehicle wheel has contacted a step.

As shown in FIG. 8, in the present process routine, the braking/drive force setting unit 66 determines whether it is determined by the level estimation unit 65 that the vehicle operation level of the driver is high (S21). When it is determined that the vehicle operation level is high (S21: YES), the braking/drive force setting unit 66 ends the present process routine. On the other hand, when it is not determined that the vehicle operation level is high (S21: NO), the braking/drive force setting unit 66 determines whether it is determined by the second step determination unit 632 that the vehicle wheels have climbed over a step for stopping a vehicle (S22). When it is determined that the vehicle wheels have climbed over a step for stopping a vehicle (S22: YES), the braking/drive force setting unit 66 executes a stop request control, which will be described later, i.e., proceeds to step S25, which will be described later.

On the other hand, when it is not determined that the vehicle wheels have climbed over a step for stopping a vehicle (S22: NO), the braking/drive force setting unit 66 determines whether it is determined by the step contact determination unit 61 that the vehicle wheels have run on the step (S23). When it is not determined that the vehicle wheels have run on the step (S23: NO), the braking/drive force setting unit 66 ends the present process routine. On the other hand, when it is determined that the vehicle wheels have run on the step the vehicle wheel (S23: YES), the braking/drive force setting unit 66 determines whether it is determined by the first step determination unit 631 that the step 100 on which the vehicle wheels have run is a step for stopping a vehicle (S24). When it is determined that the step 100 is a step for stopping a vehicle (S24: YES), the braking/drive force setting unit 66 executes a stop request control.

In the stop request control, the braking/drive force setting unit 66 sets the drive force request value FXdR to "0" and transmits the drive force request value FXdR to the drive control unit 51 (S25). Subsequently, when a braking force required to stop the vehicle is referred to as a stop braking force FXb1, the braking/drive force setting unit 66 sets the braking force request value FXbR to the stop braking force FXb1, and transmits the braking force request value FXbR to the braking control unit 52 (S26). In the meantime, the stop braking force FXb1 may be a preset predetermined value or may be a value that varies depending on the vehicle body speed VS, the slope SR of the road surface and the like. When the vehicle is stopped, the braking/drive force setting unit 66 ends the present process routine.

On the other hand, when it is not determined in step S24 that the step 100 on which the vehicle wheels have run is a step for stopping a vehicle (NO), the braking/drive force setting unit 66 executes an acceleration suppression request control. In the acceleration suppression request control, the braking/drive force setting unit 66 calculates a value obtained by subtracting a vehicle body acceleration GS from a request acceleration GR, as an acceleration deviation ΔG (S27). The vehicle body acceleration GS is an actual acceleration of the vehicle at present or an actual acceleration-based value. The request acceleration GR is a predicted value of the acceleration that is assumed from the drive force FXd of the vehicle at present. The vehicle wheels contact the step 100, so that the acceleration of the vehicle is temporarily reduced. For this reason, when the vehicle wheels have contacted the step 100, the acceleration deviation ΔG becomes greater than "0". The greater the acceleration deviation ΔG is, the acceleration of the vehicle immediately after the vehicle wheels have climbed over the step 100 is more likely to increase, i.e., a feeling that the vehicle is rushing out is more likely to be strong.

Subsequently, the braking/drive force setting unit 66 calculates an acceleration suppression control amount SFX, based on the calculated acceleration deviation ΔG (S28). That is, the braking/drive force setting unit 66 calculates the acceleration suppression control amount SFX so that the greater the acceleration deviation ΔG is, the greater the acceleration suppression control amount SFX is. Then, the braking/drive force setting unit 66 calculates a drive force request value FXdR and a braking force request value FXbR, based on the calculated acceleration suppression control amount SFX, transmits the drive force request value FXdR to the drive control unit 51 and transmits the braking force request value FXbR to the braking control unit 52 (S29). That is, the braking/drive force setting unit 66 calculates the drive force request value FXdR so that the greater the acceleration suppression control amount SFX is, the smaller the drive force request value FXdR is. Also, the braking/drive force setting unit 66 calculates the braking force request value FXbR so that a braking force by which the vehicle will not be stopped is applied to the vehicle.

Subsequently, the braking/drive force setting unit 66 determines whether the vehicle body vibration of the vehicle has subsided (S30). That is, immediately after the vehicle wheels have climbed over the step 100, since the reaction force that is input to the vehicle body from the road surface via the vehicle wheels vibrates, the vehicle body vibrates. When the vehicle body vibrates, the vehicle body acceleration GS also vibrates. For this reason, the braking/drive force setting unit 66 can determine whether the vehicle body vibration has subsided by monitoring the vehicle body acceleration GS. When it is determined that the vehicle body vibration has not subsided yet (S30: NO), the braking/drive force setting unit 66 proceeds to step S28, i.e., continues to execute the acceleration suppression request control. On the other hand, when it is determined that the vehicle body vibration has subsided (S30: YES), the braking/drive force setting unit 66 ends the acceleration suppression request control, and ends the present process routine.

In the below, operations and effects of the present embodiment are described. Herein, operations when parking the vehicle in the parking lot are described together with effects.

When the vehicle enters the parking lot from a road, the executions of the first determination process and the second determination process are permitted, based on the information input from the navigation device 32 to the control device 50. However, when the vehicle is moving toward a parking position in the parking lot, if the vehicle body speed VS of the vehicle is equal to or greater than the vehicle body speed determination value VSTh, it can be determined that the parking assistance by the control device 50 is not yet necessary. Therefore, the stop request control or the acceleration suppression request control is not executed. That is, it is possible to suppress the stop request control or the acceleration suppression request control from being erroneously executed when the parking assistance by the control device 50 is not yet necessary.

Then, when the vehicle moves to a periphery of the parking position, the vehicle travels so that the vehicle body speed VS becomes less than the vehicle body speed determination value VSTh. For example, when moving backward the vehicle for parking in the parking position, at least one of the rear wheels RL and RR of the vehicle runs on the step 100. In this case, as shown in FIG. 3, even though the vehicle body speed VS of the vehicle decreases to "0" or around "0", for example, the drive force FXd of the vehicle increases. Then, when the rear wheel has run on the step 100, the vehicle body speed VS starts to increase. By monitoring the change in the drive force FXd and the change in the vehicle body speed VS, it is possible to determine that the rear wheel has contacted the step 100.

In the present embodiment, the determination drive force FXdTh that is used when determining whether the rear wheel (vehicle wheel) has contacted the step 100 is varied, based on the vehicle body speed VS of the vehicle and the slope SR of the road surface on which the step 100 is provided. For this reason, as compared to a case where the determination drive force FXdTh is fixed to a constant value, it is possible to accurately determine whether the rear wheel has contacted the step 100, i.e., whether the rear wheel has run on the step 100.

When it is determined that the rear wheel has run on the step 100, the height estimation value He of the step 100 is calculated. That is, the height estimation value He is calculated based on the drive force FXd in the state where the rear wheel has run on the step 100. In the present embodiment, the calculation method of the height estimation value He is different, depending on whether the vehicle wheel that has contacted the step 100 is the drive wheel (rear wheel) or the driven wheel (front wheel). For this reason, it is possible to increase the calculation accuracy of the height estimation value He of the step 100.

Also, in the present embodiment, the height estimation value He is corrected by the vehicle body speed VS and weight We at the time when the rear wheel (vehicle wheel) has run on the step 100, and the slope SR of the road surface. That is, in a case where the drive force FXd is constant, the height estimation value He is calculated so that the height estimation value He is greater when the vehicle body speed VS is high, than when the vehicle body speed VS is low. Also, in a case where the drive force FXd is constant, the height estimation value He is calculated so that the height estimation value He is greater when the slope of the road surface is a downhill slope than when the slope of the road surface is not a downhill slope. That is, in a case where the drive force FXd is constant, the height estimation value He is calculated so that the height estimation value He is greater when the inertia force of the vehicle is high upon the contact of the vehicle wheel with the step 100 than when the inertia force is low. Therefore, it is possible to further increase the calculation accuracy of the height estimation value He of the step 100.

When the height estimation value He of the step 100 calculated in this way is equal to or greater than the height determination value HeTh, it is determined that the step 100 is a step for stopping a vehicle. That is, when the vehicle body speed VS of the vehicle is high, it is determined that the step 100 is a step for stopping a vehicle in a state where the drive force FXd of the vehicle is lower than when the vehicle body speed VS is low. Also, when the slope of the road surface on which the vehicle travels is a downhill slope, it is determined that the step 100 is a step for stopping a vehicle in a state where the drive force FXd of the vehicle is lower than when the slope of the road surface is not a downhill slope. That is, it is possible to determine whether the step 100 is a step for stopping a vehicle, considering the inertia force of the vehicle and the gravity at the time when the vehicle wheel has contacted the step 100. For this reason, it is possible to improve the determination accuracy as to whether the step 100 is a step for stopping a vehicle.

When the height estimation value He of the step 100 is less than the height determination value HeTh, it is determined that the step 100 that the rear wheel has contacted is a climb-over permission step. When it is determined that the vehicle operation level of the driver is low, the acceleration suppression request control is executed.

When the acceleration suppression request control is executed, the drive force FXd of the vehicle is reduced. Also, the braking force FXb is applied to the vehicle. As a result, it is more difficult for the vehicle to accelerate, as compared to a case where the acceleration suppression request control is not executed. Thereby, when the rear wheels climb over the step 100, even though the accelerator pedal is operated so that the accelerator operation amount ACR becomes excessive or an operation start of the brake pedal is delayed, it is possible to suppress the vehicle acceleration. That is, a feeling that the vehicle is rushing out at the time when the rear wheels have climbed over the step 100 can be weakened.

In the present embodiment, the drive force request value FXdR is calculated, in accordance with the acceleration suppression control amount SFX based on the acceleration deviation ΔG (=GR−GS). That is, the drive force request value FXdR is calculated so that for a case where the acceleration deviation ΔG is large and a feeling that the vehicle is rushing out is more likely to be strong at the time when the rear wheels have climbed over the step 100, the drive force request value FXdR becomes smaller. Then, the drive of the drive device 10 is controlled, based on the drive force request value FXdR. For this reason, it is possible to further improve the effect of weakening a feeling that the vehicle is rushing out at the time when the vehicle wheel has climbed over the step 100.

Herein, in a case where a driver who has a high vehicle operation level drives the vehicle, the driver may perform the accelerator operation or the braking operation so that a feeling that the vehicle is rushing out is not strong when the vehicle wheel has climbed over a climb-over permission step. That is, it may be determined that the necessity for the execution of the acceleration suppression request control is low. In this respect, according to the present embodiment, when it is determined that the vehicle operation level of the driver is high, the acceleration suppression request control is not executed even though the vehicle wheel has run on the climb-over permission step. Therefore, it is possible to suppress the unnecessary execution of the acceleration suppression request control.

After the rear wheels have climbed over the climb-over permission step, when the vehicle body vibration subsides, the execution of the acceleration suppression request control is over. Thereafter, the vehicle is moved backward, so that the rear wheels contact another step 100 (a step for stopping a vehicle). Also in this case, as with the case where the rear wheels have contacted the climb-over permission step, since the drive force FXd and the vehicle body speed VS are changed (refer to FIG. 3), it can be determined that the rear wheels have contacted the step 100.

When the height estimation value He calculated based on the drive force FXd at the time when the rear wheels have run on the step 100 is equal to or greater than the height determination value HeTh, since it is determined that the step 100 is a step for stopping a vehicle, the stop request control is executed. Then, the drive force FXd of the vehicle becomes "0" or the drive force FXd is set to a predetermined drive force (for example, creep torque that is a drive force generated in an accelerator-off state) at which an earth between the rear wheels having contacted the step 100 and the road surface is maintained, and the braking force FXb of the vehicle is increased, so that the vehicle is automatically stopped. For this reason, even though the driver cannot appropriately perform the vehicle operation at the time when the rear wheels have run on a step for stopping a vehicle, it is possible to stop the vehicle, so that it is possible to suppress the safety of the vehicle from being deteriorated.

In the present embodiment, based on the drive force FXd of the vehicle, it is determined whether the rear wheels (vehicle wheel) have run on the step 100 or the height estimation value He of the step 100 on which the rear wheels have run is calculated. For this reason, for example, in a case where a contact surface of the step 100 with the vehicle wheel is provided with a gentle slope, it may not be determined that the vehicle wheel has run on the step 100 even though the vehicle wheel has actually run on the step 100. Also, even when it is determined that the vehicle wheel has run on the step 100, the height estimation value He of the step 100 is calculated as being slightly smaller than an actual height H of the step 100, so that it may not be determined that the step 100 is a step for stopping a vehicle. In this case, the stop request control may not be executed.

In this respect, according to the present embodiment, the second determination process other than the first determination process is executed. That is, the change in the vehicle body acceleration GS of the vehicle is monitored, and when the vibration width AGS of the vehicle body acceleration GS is equal to or greater than the determination vibration width AGSTh, it is determined that the rear wheels (vehicle wheel) have climbed over a step for stopping a vehicle. When it is determined by the second determination process that the rear wheels have climbed over a step for stopping a vehicle, the stop request control is executed. Therefore, it is possible to stop the vehicle immediately after the rear wheels have climbed over the step for stopping a vehicle, and to suppress the safety of the vehicle from being deteriorated.

Also, in the present embodiment, when it can be determined that the vehicle is traveling on a road, based on the position information input from the navigation device 32 and the like, the stop request control or the acceleration suppression request control is not executed. For this reason, when the vehicle is traveling on a road surface of which irregularity is relatively large, a so-called rugged road, it is possible to suppress the stop request control or the acceleration suppression request control from being erroneously executed.

In the meantime, there is a case where the vehicle is moved forward to park the vehicle in a parking position. In this case, since the operations are substantially the same as the case where the vehicle is moved backward to park the vehicle in the parking position, the descriptions thereof are omitted.

The above embodiment may be modified as follows. The above embodiment and following modified embodiments can be implemented in combination without technical inconsistency.

In the above embodiment, the vehicle operation level is estimated using the history of the accelerator operation and the history of the braking operation. However, the present invention is not limited thereto. For example, the vehicle operation level may be estimated without using the history of the braking operation inasmuch as the history of the accelerator operation is used. Also, the vehicle operation level may be estimated using a history of a steering operation. Also, in a case of a vehicle capable of executing an emergency braking control for avoiding a collision between the host vehicle and an obstacle, it may be estimated that the lower an execution frequency of the emergency braking control is, the higher the vehicle operation level is.

In the above embodiment, when it is determined that the vehicle operation level is high, not only the acceleration suppression request control but also the stop request control is not executed. However, even though it is determined that the vehicle operation level is high, when it is determined by the second determination process that the vehicle wheel has climbed over a step for stopping a vehicle or it is determined by the first determination process that the step that the vehicle wheel has contacted is a step for stopping a vehicle, the stop request control may be executed.

Even when it is determined that the vehicle operation level is high, the acceleration suppression request control may be executed. For example, in the acceleration suppression request control that is executed when it is determined that the vehicle operation level is high, the acceleration suppression control amount SFX may be calculated so that the acceleration suppression control amount SFX becomes smaller than a case where it is determined that the vehicle operation level is low.

The acceleration suppression request control or the stop request control may be executed, irrespective of the vehicle operation level.

When executing the acceleration suppression control, the acceleration suppression control amount SFX may be varied by other parameters different from the acceleration deviation ΔG. For example, when executing the acceleration suppression request control, irrespective of the vehicle operation level, the acceleration suppression control amount SFX may be calculated so that the lower the estimation value of the vehicle operation level is, the greater the acceleration suppression control amount SFX is. Also, the acceleration suppression control amount SFX may be calculated to be greater as the height estimation value He of the step 100 becomes larger.

When executing the acceleration suppression control, the acceleration suppression control amount SFX may be fixed to a preset predetermined value.

The process for deciding whether or not to permit the executions of the respective determination processes on the basis of the position information of the host vehicle and the like may be omitted, inasmuch as the respective determination processes are not executed when the vehicle body speed VS is equal to or greater than the vehicle body speed determination value VSTh.

When the executions of the respective determination processes are permitted based on the position information of the host vehicle and the like, even though the vehicle body speed VS is equal to or greater than the vehicle body speed determination value VSTh, the respective determination processes may be executed.

In the above embodiment, it is determined in which of the areas the host vehicle is traveling, based on the information obtained from the navigation device 32 mounted on the vehicle. However, when information can be obtained from other devices that are not mounted on the vehicle, other than the in-vehicle device such as the navigation device 32 mounted on the vehicle, it is determined in which of the areas the host vehicle is traveling, based on the information obtained from the other devices. As the other devices, a server (cloud) provided outside of the vehicle and a tablet terminal carried by a passenger in the vehicle may be exemplified.

The vehicle may be started by the driver's vehicle operation from a state in which the vehicle is parked in a parking position. In this case, for example, although it is originally necessary to move forward the vehicle by setting a shift range to a forward range, when the shift range is erroneously set to a reverse range and the accelerator operation is performed, the vehicle is moved backward, so that the rear wheels RL and RR may run on a step for stopping a vehicle Therefore, when starting the vehicle by the driver's vehicle operation from a state in which the vehicle is parked in a parking position, if it is determined that the vehicle wheels have contacted the step 100 immediately after the shift range has been changed from a parking range to a range for traveling (the forward range or reverse range), it may be determined that the step 100 is a step for stopping a vehicle, and the stop request control may be executed. Also, when starting the vehicle by the driver's vehicle operation from a state in which the vehicle is parked in a parking position, if it is determined that the vehicle wheels have contacted the step 100 immediately after the shift range has been changed from one range of the forward range and reverse range to the other range, it may be determined that the step 100 is a step for stopping a vehicle, and the stop request control may be executed.

In the second determination process, other parameters different from the vehicle body acceleration GS may be used inasmuch as the parameters relate to shock due to a contact between the road surface and the vehicle wheels after climbing over the step 100. As the other parameters, an acceleration in an upper and lower direction of the vehicle, a value obtained by differentiating a wheel speed with respect to time, an air pressure of a tire of a vehicle wheel, expansion and contraction of a suspension, and a magnitude of a sound that is generated when the vehicle wheels have landed on a road surface may be exemplified.

When the step 100 in front of the vehicle with respect to the traveling direction is detected based on the information acquired by the monitoring device 31, the information about the step 100 may be analyzed and it may be determined whether the step 100 is a step for stopping a vehicle, before the vehicle wheel contacts the step 100. Then, when the vehicle wheel contacts the step 100, if it is determined that the step 100 is a step for stopping a vehicle, the stop request control may be executed. Also, when the vehicle wheel contacts the step 100, if it is not determined that the step 100 is a step for stopping a vehicle, i.e., if it is determined that the step 100 is a climb-over permission step, the acceleration suppression request control may be executed.

In the above embodiment, the height estimation value He based on the drive force FXd of the vehicle is corrected by the vehicle body speed VS and weight We of the vehicle and the slope SR of the road surface, and it is determined whether the corrected height estimation value He is equal to or greater than the height determination value HeTh. However, the height estimation value He based on the drive force FXd of the vehicle may not be corrected by the vehicle body speed VS and weight We of the vehicle and the slope SR of the road surface. In this case, instead of not correcting the height estimation value He, the height determination value HeTh may be corrected by the vehicle body speed VS and weight We of the vehicle and the slope SR of the road surface. Also in this case, it is possible to achieve the operational effects equivalent to the above embodiment.

When ones of the front wheels FL and FR and the rear wheels RL and RR run on the step 100, the vehicle is inclined relative to the road surface. That is, the pitch angle PR of the vehicle is changed. Specifically, the higher the step 100 is, the greater an amount of change in the pitch angle PR is. Therefore, the height estimation value He of the step 100 may be calculated based on the pitch angle PR of the vehicle at the time when it is determined that the vehicle wheels have contacted the step 100, and when the height estimation value He is equal to or greater than the height determination value HeTh, it may be determined that the step 100 is a step for stopping a vehicle. On the other hand, when the height estimation value He is equal to or smaller than the height determination value HeTh, it may be determined that the step 100 is a climb-over permission step.

In the acceleration suppression request control, if it is possible to suppress the vehicle acceleration, the drive control unit 51 may be requested to reduce the drive force FXd, without requesting the braking control unit 52 to increase the braking force FXb. Also, in the acceleration suppression request control, if it is possible to suppress the vehicle acceleration, the braking control unit 52 may be requested to increase the braking force FXb, without requesting the drive control unit 51 to reduce the drive force FXd.

Even though it is determined that the step 100 that the vehicle wheel has contacted is a climb-over permission step, when the braking operation of the driver or the decrease in the accelerator operation amount ACR is detected, the acceleration suppression request control may not be executed.

Even though it is determined that the step 100 that the vehicle wheel has contacted is a step for stopping a vehicle, when the braking operation of the driver is detected, the stop request control may not be executed.

Whether the vehicle wheel has contacted the step 100 is determined using the drive force FXd of the vehicle. For this reason, in a state where the braking force FXb is applied to the vehicle, the accuracy of the determination is lowered. Therefore, when the braking force FXb is applied to the vehicle by an actuation of a regular brake and when the braking force FXb is applied to the vehicle by an actuation of a parking brake, the determination may not be executed.

When the driver performs the braking operation even though it is determined that the vehicle wheel has contacted the step 100, since it may be possible to determine that the driver has an intention to stop the vehicle or to suppress the vehicle acceleration, the stop request control or the acceleration suppression request control may not be executed.

In the above embodiment, when it is not determined by the first determination process that the step 100 that the vehicle wheel has contacted is a step for stopping a vehicle, the acceleration suppression request control is executed. However, if the stop request control is executed when it is determined by the first determination process that the step 100 that the vehicle wheel has contacted is a step for stopping a vehicle, the acceleration suppression request control may not be executed when it is not determined that the step 100 is a step for stopping a vehicle.

In the stop request control, the parking brake configured to apply the braking force to only the rear wheels RL and RR may be actuated, not the regular brake configured to apply the braking force to the respective vehicle wheels FL, FR, RL and RR.

The determination as to whether the vehicle wheel has contacted the step 100 may be performed by a separate method from the method described in the above embodiment. For example, it may be determined whether the vehicle wheel has contacted the step 100 by using a variation in the vehicle body acceleration GS of the vehicle, a variation in the pitch angle PR, and the like.

The vehicle including the control device 50 that has also a function as the travel assistance device may be a front-wheel-drive vehicle in which the drive force FXd output from the drive device 10 is transmitted to only the front wheels FL and FR or a four-wheel-drive vehicle in which the drive force FXd is transmitted to both the front wheels FL and FR and the rear wheels RL and RR.

In the above embodiment, the driver performs the drive operation. However, for example, instead of the drive operation of the driver, other control device configured to output an instruction to the drive device 10 and the braking device 20 of the vehicle for controlling the vehicle travel, such as an automatic parking control, a collision prevention control and the like, and the control device 50 can be combined. For example, in the automatic parking control, a stop position of the vehicle is set based on external information about a position of the step 100, an area of a parking space, and the like obtained from the capturing means such as a camera, the vehicle is moved to the stop position, and the vehicle is stopped in the stop position. Therefore, for example, when the step 100 cannot be recognized or when the step 100 in a parking space on an opposite side adjacent to the parking space for the host vehicle is falsely recognized as the step 100 in the parking space for the host vehicle, the vehicle wheels of the vehicle may climb over the step 100 and then travel due to an inappropriate instruction to the drive device 10 or an inappropriate instruction to the braking device 20 from the automatic parking control. However, when the parking assistance by the control device 50 is combined with the automatic parking control, it is possible to easily park the vehicle in the set parking space.

Also, when the vehicle is stopped, the step 100 is shaded by the vehicle body, so that it may not be possible to recognize a correct position by the capturing means. Therefore, when there is no effective target other than the step 100, the automatic parking control outputs an instruction for stop to the drive device 10 or braking device 20 of the vehicle by estimating a relative position between the step 100 and the vehicle from advance information. However, the detection accuracy of the vehicle speed is lowered at an extremely low speed, so that an error may occur in an actual stop position, more than expected. Also in this case, when the parking assistance by the control device 50 is combined with the automatic parking control, it is possible to easily park the vehicle in the set parking space.

Also, in the collision prevention control using a radar, it is not possible to prevent the climb-over of the step 100 due to an erroneous operation in a parking space in which there is no obstacle such as a vehicle, a building and the like in a traveling direction. However, when the parking assistance by the control device 50 is combined with the collision prevention control, it is possible to easily park the vehicle in the set parking space.

In the below, the technical matters that can be perceived from the above embodiment and the modified embodiments are described.

(A) A step height estimation device configured to estimate a height of a step that a vehicle wheel of a vehicle has contacted, the step height estimation device comprising:
a height estimation unit configured to perform calculation so that an estimation value of the height of the step that the vehicle wheel has contacted increases as a drive force of the vehicle at the time when the vehicle wheel has contacted the step increases.

The invention claimed is:

1. A vehicle travel assistance device configured to assist vehicle travel, the vehicle travel assistance device comprising:
a step determination unit that, when a step for stopping a vehicle of steps for which it is possible to detect that a vehicle wheel has contacted is set as a step for stopping a vehicle, executes a determination process for determining whether the step that the vehicle wheel has contacted is the step for stopping a vehicle; and
a braking/drive force setting unit that, when it is determined by the determination process that the step is the step for stopping a vehicle, executes a stop request control for requesting stopping of a vehicle by increasing a braking force of the vehicle,
wherein the step determination unit is configured to execute the determination process, based on a drive force of the vehicle at the time when the vehicle wheel has contacted the step.

2. The vehicle travel assistance device according to claim 1, further comprising a height estimation unit configured to calculate an estimation value of a height of the step so that the estimation value of the height of the step increases as the drive force of the vehicle at the time when the vehicle wheel has contacted the step increases,
wherein in the determination process, the step determination unit determines that the step is the step for stopping a vehicle, when the estimation value of the height of the step calculated by the height estimation unit is equal to or greater than a height determination value.

3. The vehicle travel assistance device according to claim 2, wherein in the determination process, the step determination unit determines that the step is the step for stopping a vehicle, in a state where the drive force of the vehicle is lower when a vehicle body speed of the vehicle is high than when the vehicle body speed is low.

4. The vehicle travel assistance device according to claim 2, wherein in the determination process, the step determination unit determines that the step is the step for stopping a vehicle, in a state where the drive force of the vehicle is lower when a slope of a road surface on which the vehicle travels is a downhill slope than when the slope of the road surface is not a downhill slope.

5. The vehicle travel assistance device according to claim 2, wherein the step determination unit is configured to execute another determination process for determining whether the vehicle wheel has climbed over the step for stopping a vehicle, based on a magnitude of shock that is applied to the vehicle wheel, and
wherein the braking/drive force setting unit executes the stop request control when it is determined by another determination process that the vehicle wheel has climbed over the step for stopping a vehicle.

6. The vehicle travel assistance device according to claim 1, wherein in the determination process, the step determination unit determines that the step is the step for stopping a vehicle, in a state where the drive force of the vehicle is lower when a vehicle body speed of the vehicle is high than when the vehicle body speed is low.

7. The vehicle travel assistance device according to claim 6, wherein the step determination unit is configured to execute another determination process for determining whether the vehicle wheel has climbed over the step for stopping a vehicle, based on a magnitude of shock that is applied to the vehicle wheel, and
wherein the braking/drive force setting unit executes the stop request control when it is determined by another determination process that the vehicle wheel has climbed over the step for stopping a vehicle.

8. The vehicle travel assistance device according to claim 1, wherein in the determination process, the step determination unit determines that the step is the step for stopping a vehicle, in a state where the drive force of the vehicle is lower when a slope of a road surface on which the vehicle travels is a downhill slope than when the slope of the road surface is not a downhill slope.

9. The vehicle travel assistance device according to claim 1, wherein the step determination unit is configured to execute the determination process, based on a pitch angle of the vehicle at the time when the vehicle wheel has contacted the step.

10. The vehicle travel assistance device according to claim 1, wherein the vehicle is provided with a monitoring device configured to monitor a periphery of the vehicle, and
wherein the step determination unit is configured to execute the determination process, based on an analysis result on the step detected by the monitoring device.

11. The vehicle travel assistance device according to claim 1, wherein the step determination unit is configured to execute another determination process for determining whether the vehicle wheel has climbed over the step for stopping a vehicle, based on a magnitude of shock that is applied to the vehicle wheel, and
wherein the braking/drive force setting unit executes the stop request control when it is determined by another determination process that the vehicle wheel has climbed over the step for stopping a vehicle.

12. The vehicle travel assistance device according to claim 11, further comprising an execution decision unit configured to acquire position information of the vehicle, and to decide whether or not to permit executions of the respective determination processes by the step determination unit, based on the position information.

13. The vehicle travel assistance device according to claim 11, wherein the step determination unit does not execute the respective determination processes when a vehicle body speed of the vehicle is equal to or greater than a vehicle body speed determination value.

* * * * *